March 20, 1928.
G. W. SWIFT, JR
1,662,871
ANGULARLY ADJUSTABLE ROTARY CUTTER, SLITTER, CREASER, AND THE LIKE
Filed Nov. 13. 1926     5 Sheets-Sheet 1
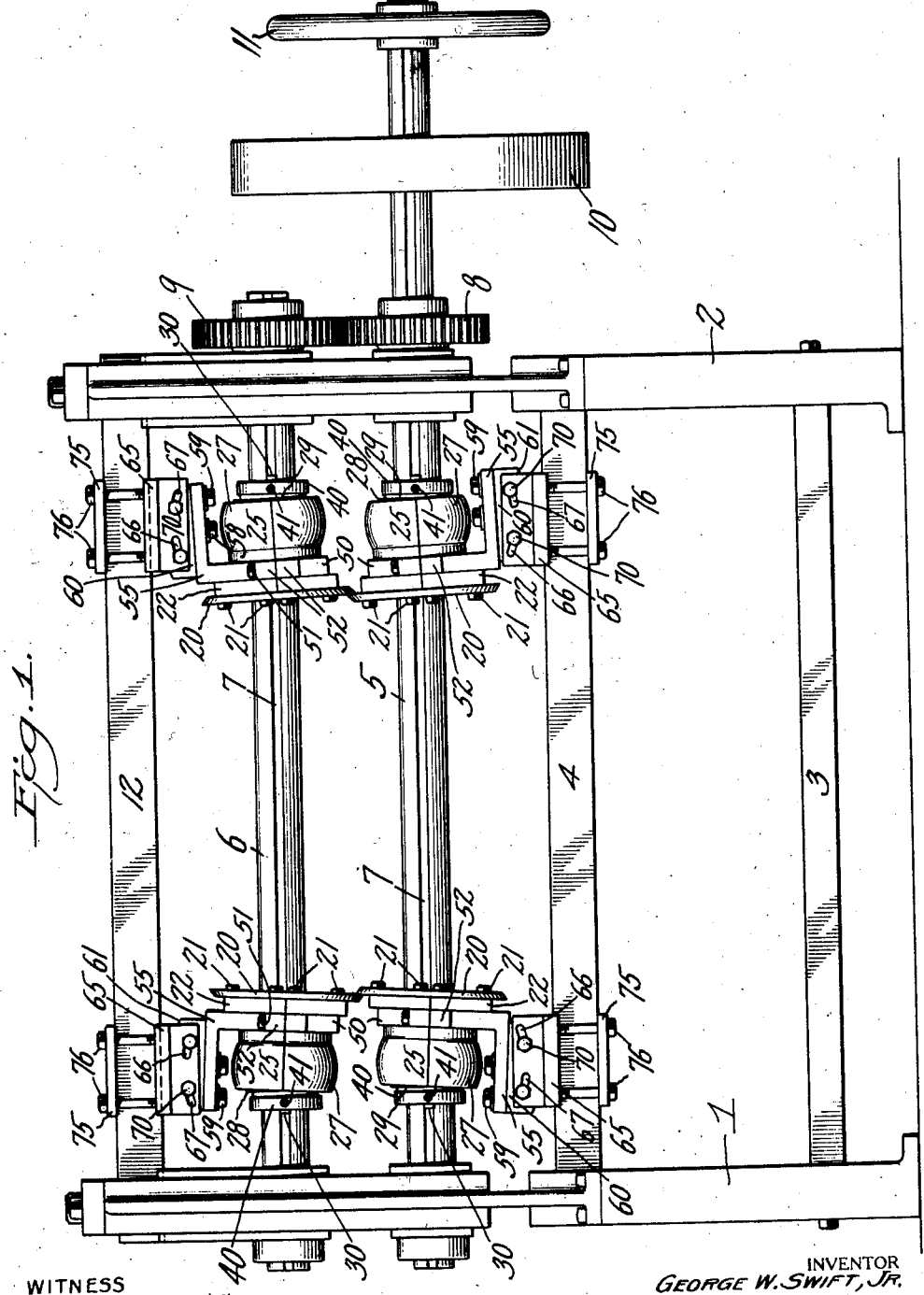
INVENTOR
GEORGE W. SWIFT, JR.
WITNESS
BY
ATTORNEYS

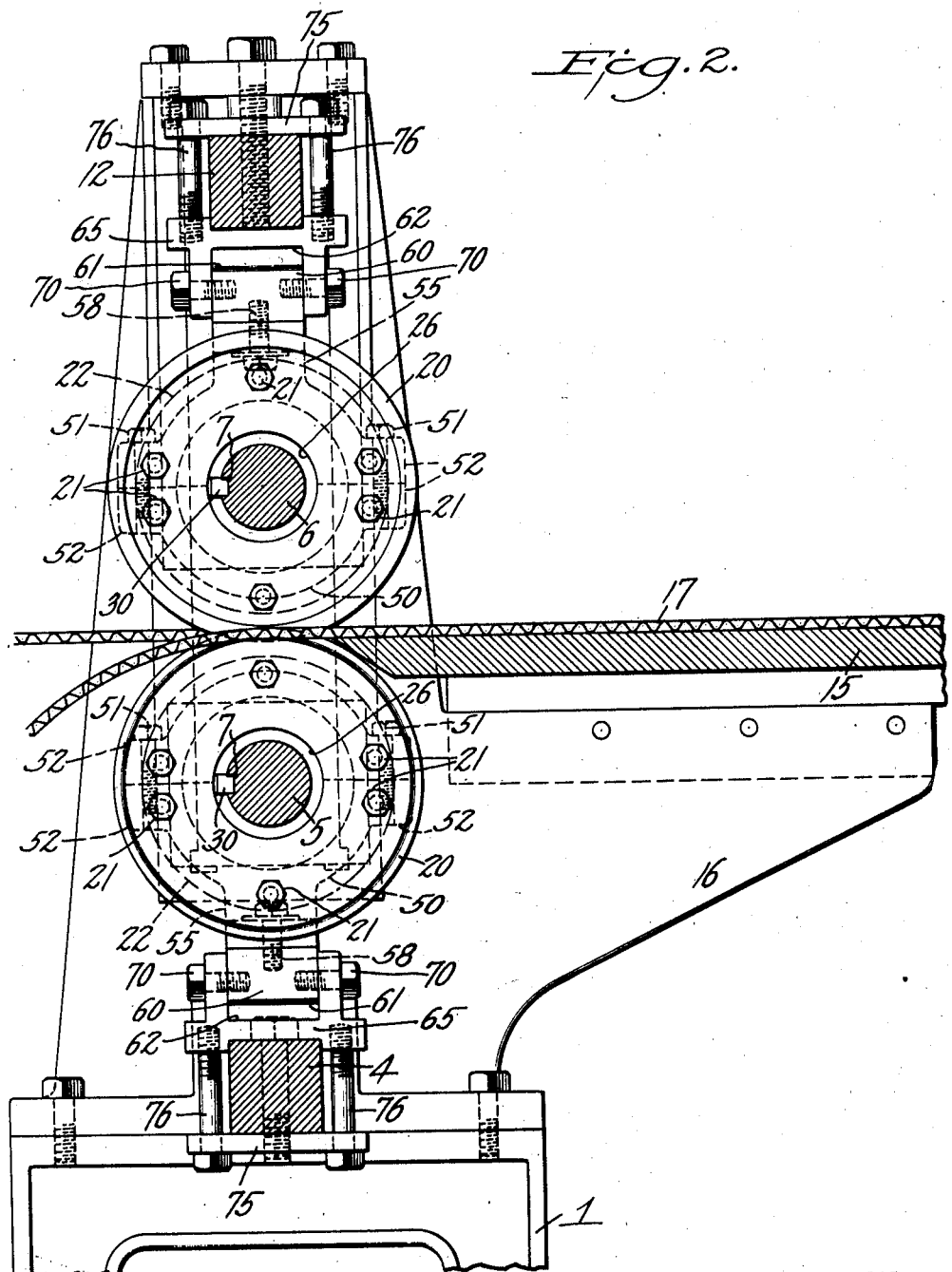

March 20, 1928.
G. W. SWIFT, JR
1,662,871
ANGULARLY ADJUSTABLE ROTARY CUTTER, SLITTER, CREASER, AND THE LIKE
Filed Nov. 13, 1926   5 Sheets-Sheet 3
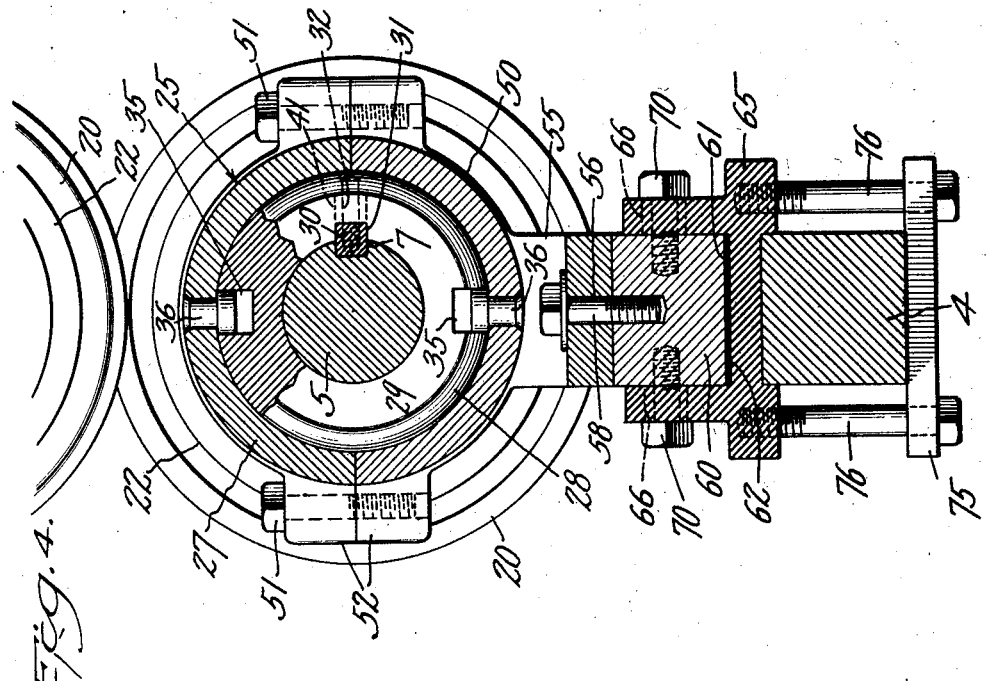
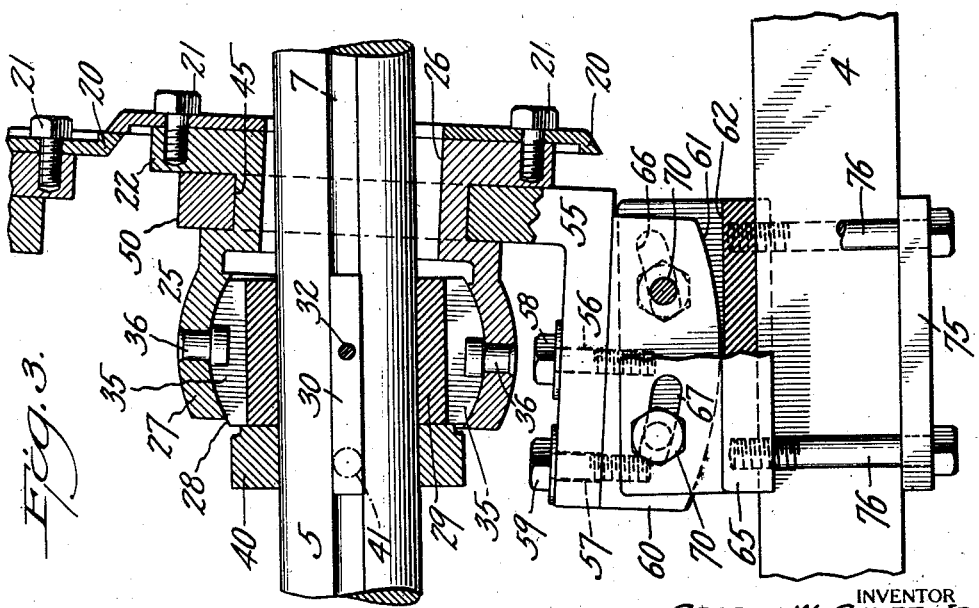
WITNESS
Oliver W. Holmes
INVENTOR
GEORGE W. SWIFT, JR.
BY
ATTORNEYS March 20, 1928. 1,662,871
G. W. SWIFT, JR
ANGULARLY ADJUSTABLE ROTARY CUTTER, SLITTER, CREASER, AND THE LIKE
Filed Nov. 13, 1926 5 Sheets-Sheet 4

WITNESS
Oliver N. Holmes

INVENTOR
GEORGE W. SWIFT, JR.
BY
ATTORNEYS

March 20, 1928.  
G. W. SWIFT, JR  
1,662,871  
ANGULARLY ADJUSTABLE ROTARY CUTTER, SLITTER, CREASER, AND THE LIKE  
Filed Nov. 13, 1926  5 Sheets-Sheet 5
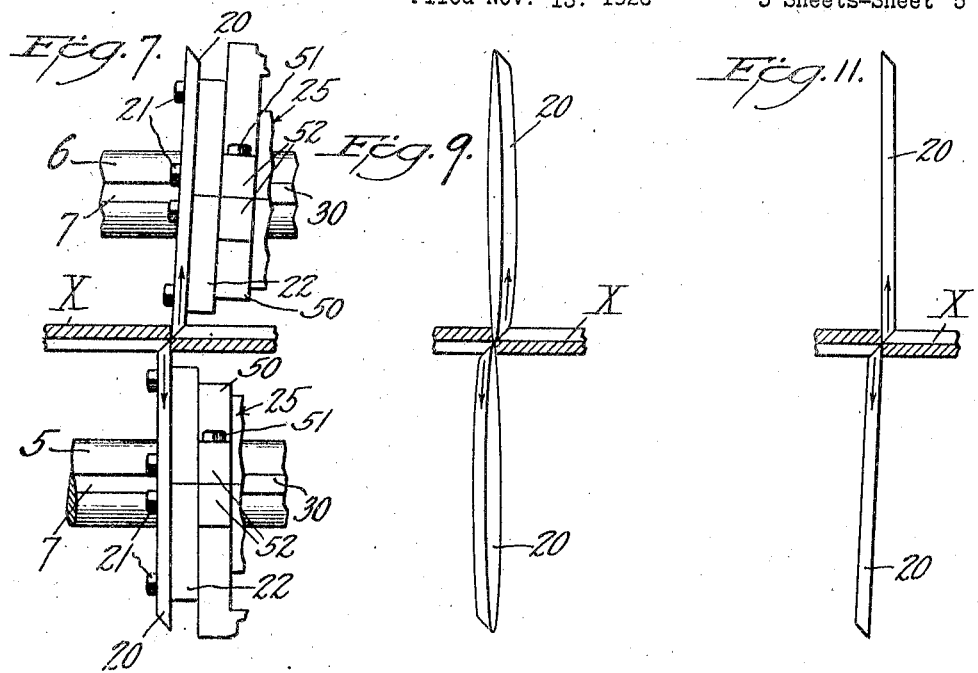
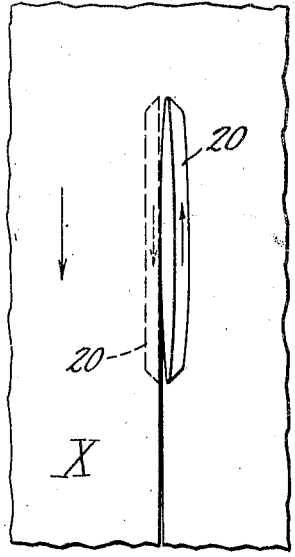
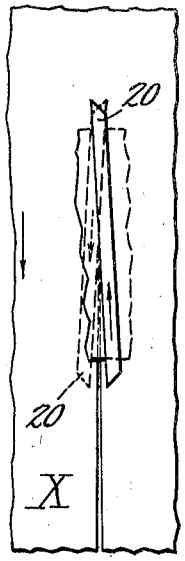
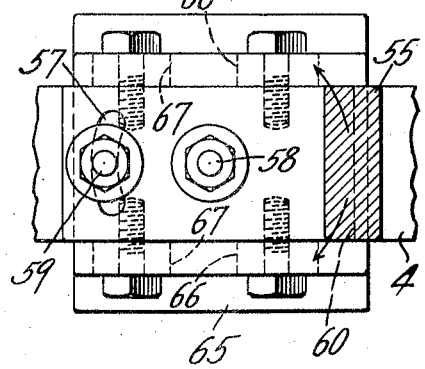
WITNESS
Oliver W. Holmes
INVENTOR
GEORGE W. SWIFT, JR.,
BY
ATTORNEY Patented Mar. 20, 1928.

1,662,871

UNITED STATES PATENT OFFICE.

GEORGE W. SWIFT, JR., OF BORDENTOWN, NEW JERSEY, ASSIGNOR TO GEORGE W. SWIFT, JR., INC., OF BORDENTOWN, NEW JERSEY, A CORPORATION OF NEW JERSEY.

ANGULARLY-ADJUSTABLE ROTARY CUTTER, SLITTER, CREASER, AND THE LIKE.

Application filed November 13, 1926. Serial No. 148,239.

Long experience in the manufacture and operation of machinery for cutting, trimming, creasing and otherwise changing the form of composite paper sheets or boards has demonstated the fact that the accuracy of the cuts or other impressions upon the paper stock is dependent to a marked degree upon the angular relation of the operating tools to the paper stock and to each other. It frequently happens that when the operating tools are not presented in the proper angular relation that the cut, crease or other impression upon the paper stock will be rough or ragged, and when operating upon plural ply paper stock the improper angular relation of the tools sometimes tends to separate the outer plies from the body of the stock.

To overcome such imperfect work in operating upon paper stock the present invention contemplates mounting rotary machine tools, such as cutters, slitters, trimmers, creasers, perforators, etc. upon operating heads which can be angularly adjusted with relation to the paper stock to be operated upon so as to enable the machine operator to adjust the working tools to the most effective angle for performing the particular work in hand.

In the preferred embodiment of the present invention, complementary or co-operating rotary machine tools are arranged oppositely in the plane of feed of the paper stock to be operated upon, and the operating heads carrying the machine tools are adjustably mounted so that the tools may be presented at any angle with respect to the horizontal and vertical longitudinal planes of the machine. Each of the operating heads comprises, in its preferred form, a hollow tool-carrying head surrounding a driving shaft and having a splined universal joint connection therewith, and a universally adjustable bearing bracket mounted upon a fixed part of the supporting frame and constituting an adjustable bearing for the operating head to hold it to its work in the desired angularly adjusted position. The machine tools are detachably mounted upon the operating heads and the form of tool can therefore be readily changed to suit the work to be performed.

In order that the invention may be fully understood it will first be described with reference to the accompanying drawings and afterwards pointed out more particularly in the annexed claims.

In said drawings:

Figure 1 is an end elevation of a machine for cutting or trimming paper board and the like embodying the present invention;

Figure 2 is a vertical longitudinal sectional view of the same on an enlarged scale;

Figure 3 is an enlarged detail elevation partly in section showing the universal adjustable operating head carrying a machine tool in the form of a circular knife;

Figure 4 is a vertical longitudinal sectional view of the same;

Figure 6 is a detail sectional plan view of one of the universally adjustable bearing brackets for the operating heads;

Figure 7 is a detail elevation illustrating a pair of cooperating circular cutters mounted upon the adjustable operating heads, the lower cutter being presented in a vertical longitudinal plane while the upper cutter is arranged on a slight angle to said vertical plane;

Figure 8 is a detail diagrammatic plan view of the cutters arranged as shown in Figure 7;

Figures 9 and 10 are diagrammatic views showing respectively a front elevation and a plan of upper and lower adjustably mounted cutters arranged in vertical planes inclined oppositely to the vertical longitudinal plane of the machine;

Figure 11 is a diagrammatic front elevation of cooperating cutters in which the upper cutter is in the vertical longitudinal plane of the machine while the lower cutter is in a plane inclined to said vertical longitudinal plane.

Figure 5:
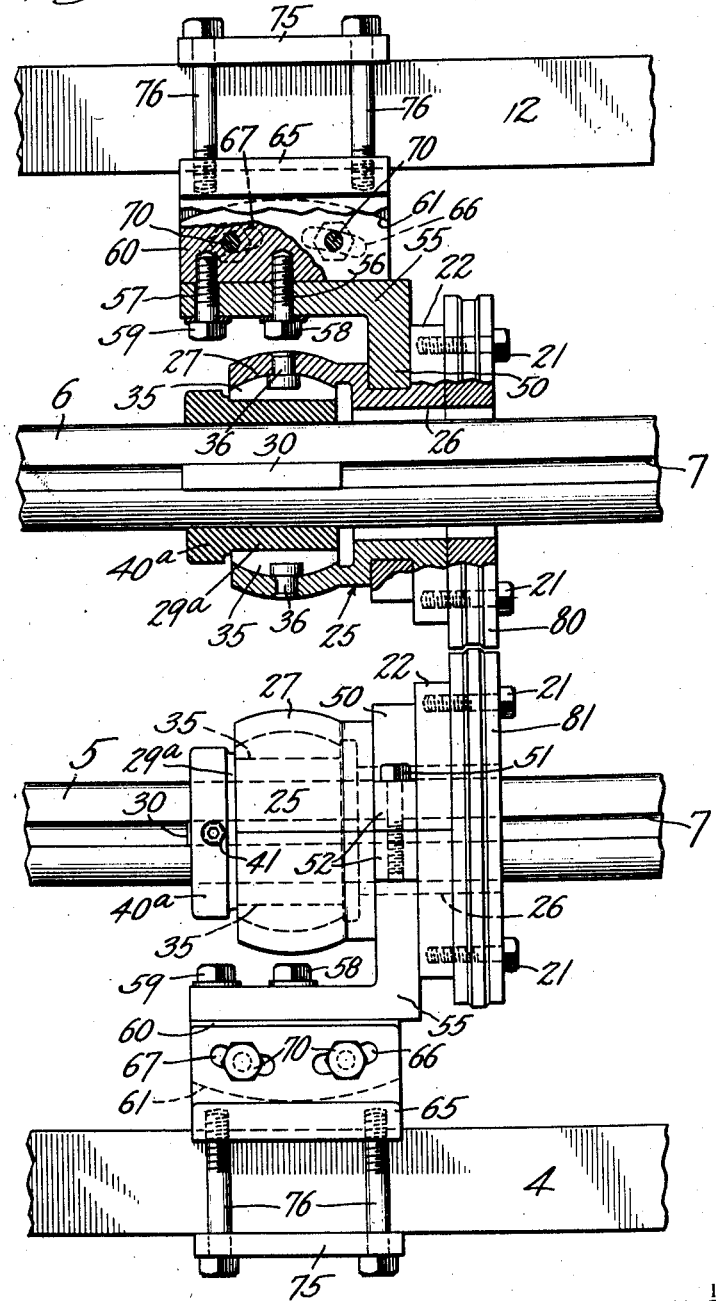
Figure 5 is a detail elevation partly in section illustrating machine tools in the form of rotary creasing dies mounted upon said adjustable operating heads.

In the embodiment of the present invention illustrated in the accompanying drawings, the working parts of the machine are mounted upon a heavy framework which is illustrated in the form of the upright side frames 1, 2 braced by the heavy rectangular cross-bars 3, 4 and 12. The upright side frames have suitable bearings in which are journalled the two heavy transverse shafts 5 and 6 formed with spline grooves 7 extending from end to end and carrying intermeshing gears 8, 9 just outside of the side frame 2 by which the two shafts are caused to rotate in unison. The lower shaft 5 is shown as the drive shaft, it being provided with a belt pulley 10 and a handwheel 11. It will be understood, however, that this simple form of machine is merely illustrative and that the shafts upon which the operating parts are mounted may be variously arranged and otherwise driven since these features do not constitute any part of the present invention.

In Figure 2 is shown a conventional form of feed table 15 mounted upon bracket extensions 16 of the machine side frames. A diagrammatic illustration of a section of corrugated composite paper board is shown at 17, this paper stock being represented in the act of passing through trimming cutters which are mounted in the machine in accordance with the principles involved in the present invention.

For the purpose of illustrating the present invention the machine is shown equipped with two pairs of trimming cutters, one of each pair of said cutters being adjustably mounted upon each of the shafts 5 and 6. The mounting and adjustment of the individual cutters is the same in all four cutters shown so that a description of one of these structures will be understood to apply to all of the cutter mountings, the only distinction between the adjustable mounting of the cutters upon shaft 5 over those mounted upon shaft 6 being that the cutters upon shaft 5 are adjustably controlled by bearing brackets mounted upon the lower frame bar 4, while those cutters upon shaft 6 are controlled by brackets carried by the top frame bar 12.

The rotary machine tool, shown in the first five figures of the drawings as a circular trimming cutter 20, is formed with a large central opening to freely surround the shaft 5 or 6 and is rigidly secured by bolts 21 to the heavy annular flange 22 of a hollow sectional tool carrying member which is referred to herein as the operating head. This operating head indicated generally by the reference numeral 25 is a hollow shell-like structure formed in two complementary halves for conveniently fitting it over the shaft and on to the bearing block by which it is driven. The main opening through member 25 indicated at 26 is of sufficiently greater diameter than the supporting shaft to permit the free movement of member 25 angularly upon the shaft. The operating head 25 is formed with an outwardly presented concave bearing collar 27 which closely fits over the spherical surface 28 of a bearing block 29 that embraces the shaft 5 or 6 and is splined to the shaft to rotate therewith by means of a key 30 adjustably seated in the keyway 7 and is held in the corresponding keyway 31 of block 29 by means of a screw 32 passing from the spherical surface 28 of block 29 into a threaded opening formed in the key 30. The bearing block 29 is also formed with diametrically opposite slots 35 which extend parallel with the shaft 5 or 6 and receive the headed ends of the inwardly projecting radial pins 36 carried by the concave bearing shell 27 of member 25. These pins 36 may, if preferred, carry anti-friction rollers upon their headed inner ends for reducing frictional engagement with the surfaces of the slots 35 of bearing block 29. The bearing block 29 secured to its supporting shaft and the surrounding concave bearing shell 27 with its pin and slot connection with said bearing block constitute in effect a ball and socket or universal flexible joint between the operating head and the shaft.

40 is a circular collar surrounding the shaft 5 or 6 and provided with a hollow set-screw 41 which seats upon the end of the key 30 and locks it firmly in the keyway 7. The collar 40 may be made integral with the bearing block 29 as shown in Figure 5 of the drawings, but for convenience of manufacture it is preferably a separate part as indicated in Figure 3 of the drawings.

The sectional operating head 25 is formed with a deep annular bearing groove 45 just back of the tool carrying flange 22 and seated in this bearing groove 45 is a sectional bearing collar 50 consisting of two half bearing rings secured together by bolts 51 passing through integral lugs 52. The sectional bearing ring 50 and the circular machine tool secured to sectional flange 22 serve to hold the sectional operating head 25 together in the operative relation described. Half of the bearing ring 50 is formed integral with an angular supporting bracket 55 formed with a pivot opening 56 and a concentric slot 57 shown best in Figure 6 of the drawings. This bracket 55 is secured to the upper face of an adjustable block 60 by means of screw bolts 58 and 59 which extend respectively through the opening 56 and slot 57 and are seated in threaded openings in the outer face of block 60. The block 60 is formed with a curved face 61 resting upon the surface 62 of a flanged supporting bracket 65 which is adjustably mounted upon one of the frame bars 4 and 12. The bracket plate 65 has formed in its side flanges the curved slots 66 and 67 which are concentric with the surface 61 of block 60 and screw bolts 70 pass through said curved slots 66, 67 and are seated in threaded openings formed in the lateral faces of the block 60. By loosening the screws 70 the block 60 can be adjusted in its supporting bracket 65. The bracket plate 65 is adjustably secured on the frame bar 4 or 12 by means of a saddle plate 75 and screw bolts 76.

By the described adjustment of block 60 upon bracket plates 65 the supporting bearing collar 50 can be shifted in angular relation to the horizontal plane of feed of the machine, causing the machine tool carried by the operating head 25 to be correspondingly shifted so that it will be presented either in a plane vertical to the feed or slightly inclined inwardly or outwardly from said vertical plane. Likewise by adjusting the bracket 55 upon the pivot screw 58, the bearing ring 50 can have its angular relation shifted inwardly or outwardly with relation to the line of feed, thereby causing the machine tool carried by head 25 to be presented at an angle to the line of feed. In these adjustments it will be clear that the universal joint connection between the operating head and the shaft will automatically adjust itself to suit.

Figure 5 of the drawings shows the same general construction of operating heads having universal joint connection with supporting shafts. The bearing blocks 29$^a$ are shown integral with the collars 40$^a$ as above explained. Other parts of the mechanism are identified by the same reference numerals used above. In place of the circular trimming cutters 20 shown in other figures of the drawings, Figure 5 illustrates cooperating circular creasing dies 80, 81 secured respectively to the upper and lower operating heads. As previously pointed out it is immaterial to the present invention what form of rotary machine tool is mounted upon the adjustable operating head, the improved structure being of value in the mounting of various forms of tools where it is important to present the tool in an exact angular relation to the work being performed.

In the use of the machine for creasing dies as shown in Figure 5 it will be understood that with the proper angular adjustment of these rotating dies 80, 81, the crease or impression upon the paper stock may be made heavier or deeper on one side than on the other, thereby enabling the operator to produce a crease that will fold accurately in the particular design of box blank being made.

It should be understood that the described machine including the improved angularly adjustable heads carrying machine tools is provided with some form of feeding mechanism for moving the stock to be operated upon past the machine tools. This feed part of the machine is not illustrated, but will be understood that any suitable feeding mechanism may be employed, the form depending upon the particular machine to which the invention is applied, and also depending partly upon whether the stock to be operated upon is in the form of sheets or a continuous web.

In Figures 7, 8, 9, 10 and 11, the action of rotary knives or trimmers upon paper stock is illustrated diagrammatically with several different adjustments of the knives or trimmers. In Figures 7 and 8 the lower knife is set in a vertical plane in the line of feed of the stock while the upper knife inclines slightly away from said vertical plane. This set of the knives produces an accurate cut on plural ply paper stock, such for instance as the composite corrugated paper board in that the cutting edge of the knife recedes from the line of cut immediately after the cut is made and therefore the face of the knife is kept free from the upper layer of the composite stock as it emerges from the cut. In these figures the paper stock is moving toward the eye in Figure 7 and toward the bottom of the sheet in Figure 8, as indicated by the arrow and the cutters are rotating in the directions indicated by the arrows.

In Figures 9 and 10 the cutters 20 are represented as oppositely inclined to the direction of feed of the stock X, the stock and cutters moving in the same directions as in Figures 7 and 8. With this adjustment of the cutters it will be observed that both the upper and lower cutters are so set that the inner surfaces of the knives recede from the edge of the cut in the stock immediately after the cut is made.

In Figure 11 an adjustment of the cutters 20 is represented exactly opposite from that shown in Figures 7 and 8 in that the lower cutter is inclined to the vertical plane while the upper cutter is in the vertical plane parallel with the line of feed.

In the several adjustments shown in Figures 7, 8, 9, 10 and 11 it will be observed that the cutters 20 engage each other at their extreme peripheral edges, and do not overlap as in the arrangement of trimmers illustrated in Figures 1, 2, 3 and 4 of the drawings. In the coaction of the upper and lower cutters 20 as shown in Figures 7 to 11 it will be observed that the upper and lower cutters can be adjusted to different angular relations to the paper stock X operated upon, whereas in the case of the overlapping cutters of Figures 1 to 4 it is necessary in securing proper cooperation between the cutters that the upper and lower cutters be correspondingly adjusted, or in other words, that their overlapping engaging faces be presented in parallel relation.

In the claims the cutting, creasing or other form of rotary stock impressing tool is referred to by the generic term of machine tool, it being the intention in these claims to cover the novel angularly adjustable operating head for supporting any suitable form of tool which can be advantageously operated with the adjustable mounting set forth. In operating upon different materials, different adjusted positions of the operating heads will be required, but the main purpose of the invention is to provide adjustable mounting for the machine tools that will relieve the work from contact with the tools after they have performed their functions. This is particularly important in slitting or cutting composite sheets as above pointed out.

I claim:—

1. In a machine of the character described, the combination with a rotary shaft, of an operating head adapted to carry a machine tool, a flexible joint connection between said operating head and said shaft, and adjustable means engaging said operating head for holding the tool in the desired operative position.

2. In a machine of the character described, the combination with a rotary shaft, of an operating head adapted to carry a machine tool, a universal joint connection between said operating head and said shaft, and adjustable means engaging said operating head for holding the tool in the desired operative position.

3. In a machine of the character described, the combination with a rotary shaft supported parallel with the horizontal plane of feed of work and transverse to the line of feed thereof, of an operating head adapted to carry a machine tool, a universal joint connection between said operating head and said shaft, and an adjustable bearing engaging said operating head and adapted to support the machine tool at an angle to said horizontal plane and the line of feed.

4. In a machine of the character described, the combination with a rotary shaft, of an operating head adapted to carry a machine tool, a ball and socket joint connection between said operating head and said shaft, and adjustable means engaging said operating head for holding the tool in the desired operative position.

5. In a machine of the character described, the combination with a rotary shaft, of an operating head adapted to carry a machine tool, a flexible joint connection between said operating head and said shaft, and an angularly adjustable bearing engaging said operating head for holding the tool in the desired operative position.

6. In a machine of the character described, the combination with a rotary shaft, of a hollow operating head surrounding and spaced from said shaft, means for securing a machine tool to said operating head, a spherical surfaced bearing block secured to said shaft, a concave bearing collar upon said operating head engaging and driven by said bearing block, and adjustable means engaging said operating head for holding the tool in the desired operative position.

7. In a machine of the character described, the combination with a rotary shaft, of a hollow operating head surrounding and spaced from said shaft, means for securing a machine tool to said operating head, a spherical surfaced bearing block secured to said shaft, a concave bearing collar upon said operating head engaging said bearing block, a pin and slot driving connection between said bearing block and said concave collar, and adjustable means engaging said operating head for holding the tool in the desired operative position.

8. In a machine of the character described, the combination with a rotary shaft, of a hollow operating head surrounding and spaced from said shaft, means for securing a machine tool to said operating head, a spherical surfaced bearing block adjustably splined upon said shaft, slots formed in said bearing block parallel with said shaft, a concave bearing collar upon said operating head embracing and movable on said bearing block, inwardly projecting pins upon said concave collar engaging and movable in the slots of said bearing block, and adjustable means engaging said operating head for holding the tool in the desired operative position.

9. In a machine of the character described, the combination with a rotay shaft supported parallel with the horizontal plane of feed of work and transverse to the line of feed thereof, of an operating head adapted to carry a machine tool, a universal joint connection between said operating head and said shaft, and a bearing bracket engaging said operating head and universally adjustable concentrically with said universal joint.

10. In a machine of the character described, the combination with a rotary shaft supported parallel with the horizontal plane of feed of work and transverse to the line of feed thereof, of an operating head adapted to carry a machine tool, a universal joint connection between said operating head and said shaft, a bearing bracket engaging said operating head, a horizontally adjustable bracket plate, and a member interposed between said bearing bracket and said bracket plate, said bearing bracket and interposed member being relatively adjustable in one plane and said interposed member being adjustable upon said bracket plate concentrically with said universal joint.

11. In a machine of the character described, the combination with a rotary shaft, a sectional operating head having universal joint connection with said shaft and formed with an annular bearing, a sectional bearing bracket engaging said annular bearing, means adjustably supporting said bearing bracket, and a machine tool secured upon said operating head.

12. In a machine of the character described, the combination of two universally adjustable operating heads, means for rotating said operating heads, coacting machine tools mounted respectively upon said operating heads, and independent adjustable means engaging and supporting each of said operating heads.

13. In a machine of the character described, the combination of two universally adjustable operating heads, means for rotating said operating heads, coacting machine tools mounted respectively upon said operating heads, and an independent adjustable bearing bracket engaging and supporting each of said operating heads in the desired adjusted position.

14. In a machine of the character described, the combination with two oppositely arranged rotary shafts, two universally adjustable operating heads mounted respectively upon said shafts and having universal joint driving connections therewith, coacting machine tools mounted respectively upon said operating heads, and an independent adjustable bearing bracket engaging and supporting each of said operating heads in the desired adjusted position.

15. In a machine of the character described, the combination with a support for stock to be fed, of an angularly adjustable rotary machine tool, and adjustable means for supporting said tool in position to operate upon said stock with its axis of rotation inclined at the desired angle to the plane of the stock, whereby the working edge of the tool will recede the required extent from the line of its action upon the stock.

16. In a machine of the character described, the combination with a support for stock to be fed and worked upon, of an angularly adjustable rotary cutting knife, and adjustable means for supporting said knife in position to operate upon said stock with its face inclined from the vertical longitudinal plane at the line of cut, whereby the working edge of the knife will recede the required extent from the line of the cut as the cutting operation progresses.

GEORGE W. SWIFT, Jr.